(12) United States Patent
Horst

(10) Patent No.: US 9,047,461 B2
(45) Date of Patent: Jun. 2, 2015

(54) COMPUTER-IMPLEMENTED METHOD FOR REPLACING A DATA STRING

(71) Applicant: comForte 21 GmbH, Wiesbaden (DE)

(72) Inventor: Michael Horst, Wuthenow (DE)

(73) Assignee: COMFORTE 21 GMBH, Wiesbaden (DE)

( * ) Notice: Subject to any disclaimer, the term of this patent is extended or adjusted under 35 U.S.C. 154(b) by 32 days.

(21) Appl. No.: 14/072,548

(22) Filed: Nov. 5, 2013

(65) Prior Publication Data

US 2014/0150086 A1    May 29, 2014

(30) Foreign Application Priority Data

Nov. 23, 2012    (DE) .......................... 10 2012 111 383

(51) Int. Cl.

| | |
|---|---|
| *G06F 7/04* | (2006.01) |
| *G06F 17/30* | (2006.01) |
| *G06F 15/16* | (2006.01) |
| *H04N 7/16* | (2011.01) |
| *H04L 29/06* | (2006.01) |
| *H04L 9/00* | (2006.01) |
| *H04L 9/28* | (2006.01) |
| *H04K 1/00* | (2006.01) |

(Continued)

(52) U.S. Cl.
CPC ............ *G06F 21/45* (2013.01); *G06F 21/6254* (2013.01); *G06F 21/606* (2013.01); *G06F 21/6245* (2013.01); *H04L 63/0471* (2013.01); *G06F 21/6209* (2013.01); *G06F 21/6263* (2013.01); *G06F 2221/2153* (2013.01); *G06Q 20/3821* (2013.01); *G06Q 20/38215* (2013.01); *G06Q 20/385* (2013.01)

(58) Field of Classification Search
CPC ..... G06F 21/60; G06F 21/602; G06F 21/604; G06F 21/606; G06F 21/6209; G06F 21/6245; G06F 21/6254; G06F 21/6263; H04L 63/0471; G06Q 20/385
USPC ................. 726/2–4, 9, 16–17, 20–21, 26–30; 380/37, 42, 28; 713/153, 160, 713/165–167, 185, 193
See application file for complete search history.

(56) References Cited

U.S. PATENT DOCUMENTS

2005/0137969 A1    6/2005    Shah
2009/0067627 A1    3/2009    Hogl (Continued)

FOREIGN PATENT DOCUMENTS

EP    1601132 A1    11/2005
EP    2363839 A2    9/2011

OTHER PUBLICATIONS

European Search Report (EP13192726, dated Mar. 21, 2014) (5 pages).

(Continued)

*Primary Examiner* — Shewaye Gelagay
*Assistant Examiner* — Trong Nguyen
(74) *Attorney, Agent, or Firm* — The Maxham Firm

(57) ABSTRACT

A computer-implemented method for replacing a security-relevant unencrypted data string from a data record by a token in a tokenisation device. The method is structured in such a way that it works more efficiently than a replacement table with randomly generated tokens and is more secure than the generation of tokens by exclusive application of a mathematical function to the unencrypted data string.

23 Claims, 4 Drawing Sheets

(51) Int. Cl.
*G06F 21/45* (2013.01)
*G06F 21/62* (2013.01)
*G06F 21/60* (2013.01)
*G06Q 20/38* (2012.01)

(56) References Cited

U.S. PATENT DOCUMENTS

| | | | |
|---|---|---|---|
| 2011/0154466 A1* | 6/2011 | Harper et al. | 726/9 |
| 2011/0213807 A1* | 9/2011 | Mattsson | 707/802 |
| 2011/0261958 A1 | 10/2011 | Gebotys | |
| 2012/0243682 A1 | 9/2012 | Hogl | |
| 2013/0198851 A1* | 8/2013 | Spies et al. | 726/26 |
| 2014/0108813 A1* | 4/2014 | Pauker et al. | 713/189 |

OTHER PUBLICATIONS

Michael Stephenson et al., "Tokenization—A New Approach to Fully Comply with PCI 3.4 and Improve Data Security," The Connection, Sep./Oct. 2011, (4 pages).

* cited by examiner

COMPUTER-IMPLEMENTED METHOD FOR REPLACING A DATA STRING

FIELD OF THE INVENTION

The present invention relates to a computer-implemented method for replacing a security-relevant unencrypted data string from a data record by a token in a tokenisation device.

BACKGROUND OF THE INVENTION

Systems in which a payments processor uses a network to connect a large number of sales outlets and automatic teller machines on the one hand, and a large number of card providers and a large number of payments settlement systems on the other, with a central server which manages and controls the individual transactions, have become established as the typical architecture for cashless payments systems.

Here the fact that data records which contain confidential data strings, such as card or account numbers, also referred to in the following application as PANs (Primary Account Numbers), have to be not only transmitted but also processed and stored, has proved to be a challenge. In particular the PANs stored and being processed on the server must be protected so that they cannot be accessed or seen by third parties in order to prevent abuse of the payments system.

Methods have been developed for tokenising the PANs received in plain text, that is, for replacing these plain text PANs by random tokens uniquely assigned to the PANs, in order to ensure protected processing and storage of data records containing PANs. As the tables with the assignment between the replaced PANs and tokens are stored securely separately from the processing programs, there is no way in which a third party can derive the associated PANs from the data records being processed which are aliased with the aid of the tokens.

In the present context, tokenisation is understood to mean a method for replacing a data string by a substitute string which is also referred to as a token. Indispensable requirements of the tokenisation are the reversibility of the method, that is, each token must be uniquely reassignable to the original data string, and the retention of the format of the tokenisation in order to be able to process further, in particular store, the data record in which an unencrypted data string has been replaced by a token.

One way of replacing security-relevant data strings by tokens is the use of a replacement table which, for each incoming data string, contains a randomly generated token which replaces the unencrypted data string. However, such a replacement table has the disadvantage that the assignment between the data strings and the tokens must be stored somewhere after the replacement of the data string, for this assignment alone allows a data string to be reconstituted from the token when the data record has to be passed to another agency for further processing.

Alternatively, the tokenisation can also be carried out by a bijective mathematical function which is applied to the data string to be encrypted and provides the unique assignment of the unencrypted data string to the token and of the token to the unencrypted data string.

Whereas replacement tables have the disadvantage that they require a large amount of storage capacity and possibly entail specific requirements for synchronised operation of several systems for improved reliability, the generation of tokens with the aid of a mathematical function applied to the data string to be replaced involves not inconsiderable security risks.

Possible attacks on systems which attempt to process data securely with the aid of tokenisation are an attack on the method for replacing the original data string by the tokens or an attack on the reconstitution process which makes it possible to reconstitute the original data strings from the tokens.

Anybody who knows the encrypting function of a tokenisation method in which the token is generated mathematically from the original unencrypted data string can access all the current and all the future tokens generated with this algorithm. In contrast, algorithms which are based on the assignment of the unencrypted data string to a randomly generated token are more secure since, in particular, it is not possible to determine future data string/token pairs from one data string/token pair.

SUMMARY OF EMBODIMENTS OF THE INVENTION

A purpose of embodiments of the present invention is to provide a method for replacing a security-relevant data string from a data record by a token which works more efficiently than a replacement table with randomly generated tokens, or which is more secure, or both, than the generation of tokens by exclusive application of a mathematical function to the unencrypted data string.

At least one of the previously named objectives is achieved by a computer-implemented method for replacing a security-relevant unencrypted data string from a data record by a token in a tokenisation device wherein the method comprises the steps of: reception of the security-relevant unencrypted data string from a processing device, generation of a token assigned to the unencrypted data string with the steps of provision of a replacement table with random entries, each entry being assigned an index of the replacement table, division of the unencrypted data string into two part strings, the first part string consisting solely of the first character of the unencrypted string and the second part string consisting of the remaining characters of the unencrypted string, calculation of an index of the replacement table from the second part string so that an entry of the replacement table is determined, generation of a replacement character from the entry determined by the index, replacement of the single character of the first part string by the replacement character, interchanging of the first and the second part string so that the replaced character of the first part string becomes the last character or the first character of the second part string and the first character or the last character of the second part string becomes the single character of the first part string, and repetition of the preceding steps so that a token assigned to the unencrypted data string is generated, transmission of the token to the processing device, reception of the token from the processing device, reconstitution of the unencrypted data string from the token which is assigned to the unencrypted data string, with the steps of provision of the replacement table, division of the token into two part strings, the first part string consisting of all the characters except the last character of the token and the second part string consisting solely of the last character of the token, calculation of an index of the replacement table from the first part string so that a particular entry of the replacement table is determined, generation of a replacement character from the entry of the replacement table determined by the index so that the single character of the second part string is replaced by the replacement character, interchanging of the first and the second part string so that the single character of the second part string becomes the first character or the last character of the first part string and the last character or the first character of the first part string becomes the single character of the second part string, and repetition of the preceding steps so that the unencrypted data string assigned to the token is reconstituted, transmission of the unencrypted data string to the processing device.

The computer-implemented method for replacing a security-relevant data string according to the present concept is based on tokenisation of the data string, the unencrypted data string from a data record being replaced by a token.

In the context of the present invention, a data string is understood as being any kind of sequence of characters. A data record is composed of one or more of such data strings. Here the data strings in a data record can be separated from one another or marked in some way, but do not have to be. In particular, a data record can consist of a single sequence of characters which comprises a plurality of data strings. In the context of the present invention, one form of a data record is a message which comprises the unencrypted data string or the token.

In one form of embodiment, a data record can be a message describing a financial transaction which, for example, contains information about the location, object, and price of the transaction. In such a form, in the context of the present invention the unencrypted data string can then be in particular at least one part string of a so-called primary account number (PAN), that is, a sequence of digits identifying an account or a payment card. However, any other data string could be tokenised with the same method and processed securely in this way.

The method according to an embodiment of the invention combines the advantages of both methods of tokenising strings identified at the start. Each token assigned to an original unencrypted data string is generated firstly by random characters stored in a reference or replacement table, but secondly by a function which is applied to the data string to be replaced itself and in the result then refers to the replacing characters.

Here, a mathematical function applied to the original data string is used to calculate an index which determines the particular entry of the replacement table that is to be used next to replace a part of the unencrypted data string.

Accordingly, the method as disclosed herein achieves a tokenisation which is more efficient than a tokenisation which is based purely on the assignment of randomly generated tokens to the original data string. At the same time, it is more secure than a method of tokenisation which is based exclusively on a function which derives or generates a token mathematically from the original data string.

The method combines the two initially contrary methods with one another so that the generation of the token from the unencrypted data string is effected partly in that an index to the replacement table is generated mathematically from the unencrypted data string itself but the individual characters of the unencrypted data string are replaced by random replacement values which are derived from the replacement table.

The generation of the token according to an embodiment of the invention is based on a Feistel network, namely, a maximally unbalanced Feistel network in which, to generate the token, the unencrypted data string is initially divided into two part strings. The first part string consists solely of a single character of the unencrypted string and the second part string consists of the remaining characters of the unencrypted string.

In particular, the method makes it superfluous to write the replaced unencrypted data string into the replacement table as the reconstitution can be effected exclusively with the aid of the token, the calculation of the index of the replacement table, and the corresponding entry of the replacement table. In this way the replacement table can be generated completely beforehand and distributed on back-up systems, for example. Later synchronisation between identical replacement tables held in different systems at a later time is not necessary. Collisions are inherently avoided.

In the context of the present invention, a tokenisation device is understood as being a device, in particular a programme or a programme section which performs the generation of the token and the reconstitution of the unencrypted data string.

In the context of the present invention, a processing device is any device, in particular a programme or a programme section which preferably processes a data record and in this for example carries out a replacement of the unencrypted data string by the token and vice versa.

In one form of embodiment, the processing device is a capture device on a data channel which executes the steps of: capture of a data record transmitted over the data channel in a first direction, identification of the security-relevant unencrypted data string in the captured data record, transmission of the security-relevant unencrypted data string to the tokenisation device for generation of a token, reception of the token from the tokenisation device, replacement of the unencrypted data string in the data record by the token, and onward transmission of the data record with the token over the data channel.

The idea of such a capture device is to monitor the input/output channel of a further device for processing the data record and, without interfering in the other devices of the system, to replace unencrypted security-relevant data strings by tokens in all the data records which contain these strings.

The data records modified in this way by the capture device and from which the security-relevant data string can no longer be derived are then processed further by the further device. The replacement of the security-relevant unencrypted data string by the token for these lead to no change in processing whatsoever since the token preferably replaces the unencrypted data string with the formatting retained.

In particular, the data record with the token is stored in the further device. In a server for a cashless payments system the further device is a transaction data store, for example.

To ensure that data records returned or transmitted by the further device can be processed further with the unencrypted data string again, in one form of embodiment the capture device also performs the steps of: capture of a data record transmitted over the data channel in a second direction (this preferably being the opposite direction to the first direction), transmission of the data record, identification of the token in the captured data record, transmission of the token to the tokenisation device for reconstitution of the unencrypted data string, reception of the unencrypted data string from the tokenisation device, replacement of the token in the data record by the unencrypted data string, and onward transmission of the data record with the unencrypted data string over the data channel.

In an embodiment of the invention, the identification of the unencrypted data string or the token in a data record comprises determination of the length and the position of the unencrypted data string or the token in the data record.

In one form of embodiment, for this provision can be made for the data record to exhibit an identification field which contains information about the position of the unencrypted data string to be replaced in the data record, the identification field being read out to determine the position of the unencrypted data string or the token in the data record.

In particular, when the data record comprises no such identification field, it is expedient if the unencrypted data string to be replaced exhibits a uniquely identifiable pattern or structure, and then, in order to determine the position of the unencrypted data string or the token in the data record, a comparison is made of all the strings contained in the data record with a stored uniquely identifiable pattern. It is understood that the data strings to be replaced can also exhibit one of a plurality of patterns, and then all the strings contained in the data record are compared with a plurality of stored uniquely identifiable patterns.

In one form of embodiment of the invention, when the unencrypted data string to be replaced occurs in a plurality of positions in the data record, the string is replaced by the token in all the positions.

In an embodiment, the combination of tokenisation device and capture device makes it possible to record replacement and reconstitution methods for every data record. In a further form, possible attacks, in particular on the further processing device, can be detected from the nature, the frequency, in particular in correlation with the agency from which the data record originates or from which it is requested.

In one form of embodiment of the invention, the size of the alphabet used for the unencrypted data string is the same as the size of the alphabet used for the replacement characters.

To guarantee adequate security, it is advantageous if the number of repetitions of the method steps, when generating the token and when reconstituting the unencrypted data string, is at least n+1, preferably 2n, n being the length of the data string to be replaced.

In accordance with the disclosed method, the calculation of the index of the replacement table, when generating the token or reconstituting the unencrypted data string from a token, comprises the following steps: calculation of a hash value (h) by applying a hash function to a binary input comprising the part string of the data string which exhibits more than one character, and determination of the x most significant bits of the hash value as index for the replacement value to be used, x being the number of bits required to provide all the entries of the replacement table with a unique index. When truncated to x bits, the replacement table can exhibit $2^x$ entries, all of which are provided with a unique index which can be represented by the x bits.

In an embodiment, the binary input on which the hash value is applied additionally comprises a binary string (salt) of length s or the ordinal number, or both, of the repetition. Here the ordinal number of the repetition is understood as being the number of repetitions of the method steps for replacement of the individual characters of the data string including the current repetition round.

In accordance with an embodiment of the invention, the binary string (salt) comprises a not to be encrypted part string of the data string to be encrypted or an arbitrarily selected string, or both. In particular, the binary string (salt) can be composed of a combination of strings in order to increase the security of the system.

The security of the method used can be increased with the aid of such a binary string designated here as "salt" which can be employed for calculation of the index for the replacement value to be used. If an arbitrarily selected string is used as the binary string, its value can either be fixed arbitrarily by the administrator of the tokenisation engine or also be, for example, a fixed component of the code for the tokenisation engine. In one form of embodiment of the invention, the binary string for calculation of the index is a not to be encrypted part string of an unencrypted data string, for example, a PAN.

In a further embodiment, the computer-implemented method is designed for secure storage of a data string in the context of the present application in a server for a cashless payments system.

In an embodiment of the method, the token is not transmitted to other devices of the payments system. So if devices of the payments system other than the server require the unencrypted data string, that is, a PAN, for example, the unencrypted data string is reconstituted from the token first with the aid of the method according to the invention and this is then transmitted.

However, other forms of the method are conceivable in which the tokens themselves can be transmitted to other devices of the payments system. If these devices then require the unencrypted data string later for certain processing steps, the reconstitution of the unencrypted data string is carried out in the tokenisation engine. The other devices of the system forward the token for reconstitution of the unencrypted data string to the tokenisation engine or gain access to the latter in another way. However, the reconstitution of an unencrypted original data string from the token presupposes that the token can be assigned to the data string in some way.

Here, in one form of embodiment according to the invention, when the token is generated, the replacement character is calculated from the entry of the replacement table determined by the index and the character to be replaced, and when the unencrypted data string is reconstituted, the replacement character is calculated from the entry determined by the index and the character to be replaced. In such an embodiment, it is expedient if the computing operations for calculating the replacement character when generating the token and when reconstituting the unencrypted data string are mutually inverse mathematical operations, in particular, addition and subtraction, or multiplication and division.

If now, for example, the complete data of a transaction, including the unencrypted data string, are to be transmitted to a different device in the system, the token stored together with the indicated transaction number is identified in the store and then the unencrypted data string is reconstituted from the token using the method as described previously.

Insofar as the forms of embodiment described above can be at least partly realized using a software-controlled data processing device, it follows that a computer program which provides such software control and a storage medium on which such a computer program is stored must be considered as aspects of the invention.

BRIEF DESCRIPTION OF THE DRAWING

Further advantages, features, and possible applications of embodiments of the present invention will become clear from the following detailed description of one form of embodiment and the associated figures, wherein.

DETAILED DESCRIPTION OF EMBODIMENTS OF THE INVENTION

In the figures identical elements have the same reference designations.

Figure 1:
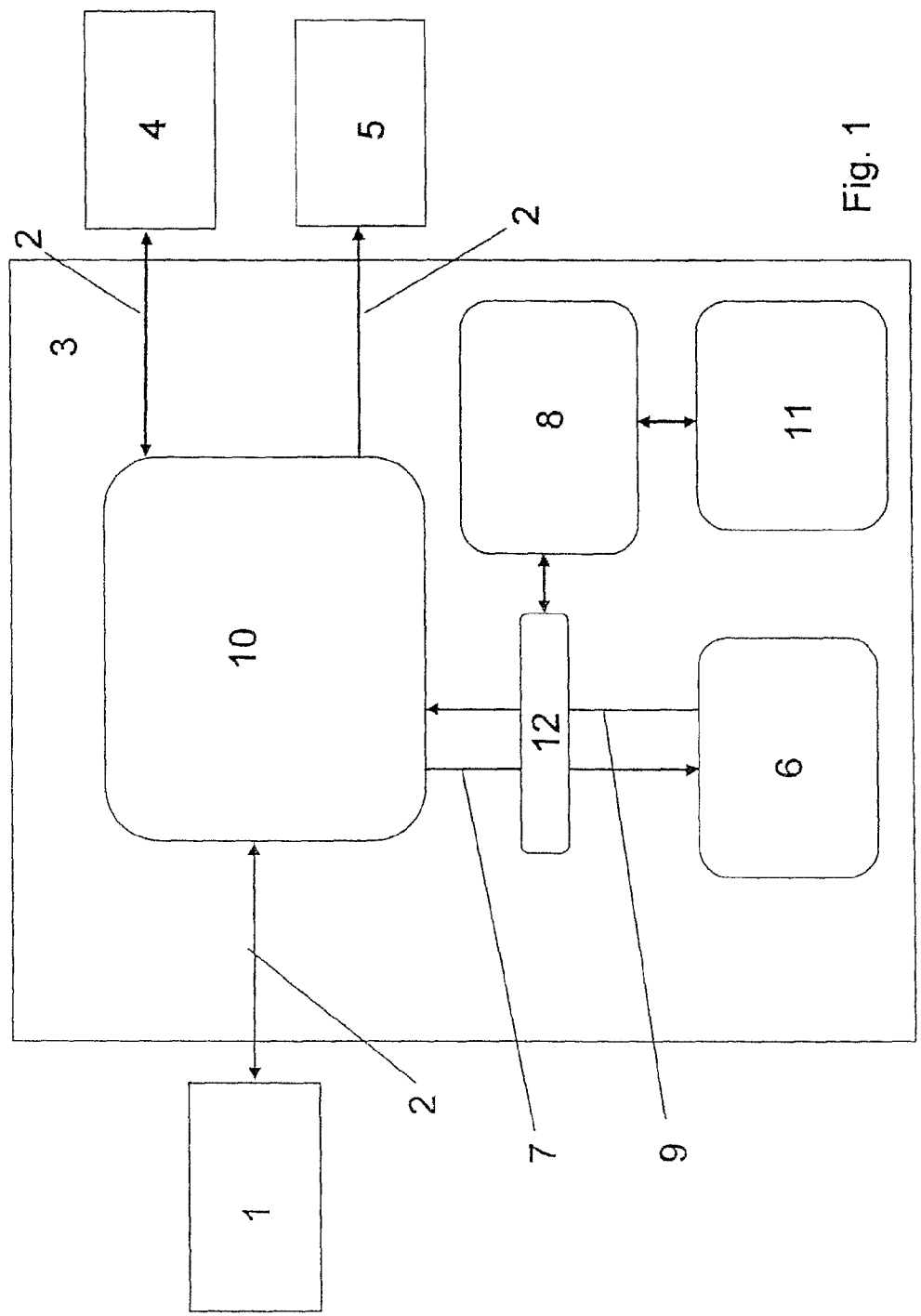
FIG. 1 shows diagrammatically a payments processing system with secure processing of PANs in the central server according to an embodiment of the invention.

FIG. 1 is a diagrammatic illustration of a payments processing system in which the method according to an embodiment of the invention is used for secure storage of a data string. The payments processing system shown consists of a plurality of check-out systems 1, one of which is illustrated in FIG. 1. The check-out system is connected via network connection 2 to central server 3. This in turn is connected via network connections 2 to both credit card providers 4 and to the actual payments settlement system or systems 5.

As shown, the server includes central processing unit 10, capture device 12, transaction data store 6, tokenisation device 8, and secure token store 11. From check-out systems 1 server 3 receives information about the transaction to be completed via network connection 2. This information comprises, in particular, the purchaser's credit card number and details of the price, the time of completion of the purchase, and the like.

Here, the information about a transaction is present in the form of a message which is transmitted via network connections 2 from and to server 3. Such a message is a data record in the context of the present invention. The information about the transaction being completed can firstly be transmitted onward from central processing unit 10 on the server directly, that is, without intermediate storage, to credit card provider 4 or to payments settlement system 5. From the viewpoint of the system implemented on server 3, the onward transmission is carried out in plain text, that is, unencrypted. However, this only means that server 3 itself does not carry out any encrypting for this transmission. Instead, channels 2 from and to the server are protected by proprietary systems. For example, networks 2 are designed as VPN channels.

The task of central processing unit 10 implemented on server 3, due to its high availability, is to process the transaction information and store it when necessary until the corresponding devices of credit card providers 4 and systems 5 are available again. In addition, usually the transaction information is stored for later processing of claims and for accumulated onward transmission to payments settlement systems 5.

To guarantee the maximum possible security of the transaction data during handling in server 3, all the PANs contained in the transaction data which here form the unencrypted data string in the context of the present embodiment of the invention, are replaced by tokens before the data is stored in transaction data store 6. For this, both the input data path 7 into transaction data store 6 and output data path 9 from the transaction data store are monitored by capture device 12. Capture device 12 is a processing device in the context of the present invention. Transaction data store 6 forms a further device for processing the data record in the context of the present invention.

All the data records to be stored on input data path 7 which contain a PAN, that is, a security-relevant unencrypted data string, are captured by capture device 12. The data record is analyzed and the unencrypted data string contained in it is sent to tokenisation device 8 (also referred to as a tokenisation engine). The unencrypted data string is received by tokenisation device 8 which replaces it by a token. The token is then sent to capture device 12 again. The capture device then replaces the unencrypted data string in the captured data record by the token and outputs the thus amended more secure data record to transaction data store 6 for storage of the data record.

When, conversely, a data record is to be read out from transaction data store 6 and sent to central processing unit 10, first the token of the data record stored in the transaction data store must be replaced again by the unencrypted data string. For this, all the data records read out from transaction data store on output data path 9 are captured by capture device 12. The data record is analyzed and the token contained in it is passed to tokenisation device 8. The token is received by the tokenisation device which replaces it again by the corresponding unencrypted data string. The unencrypted data string is then passed to capture device 12 again. The capture device then replaces the token in the captured data record read out from transaction data store 6 by the unencrypted data string and outputs the so amended data record to central processing unit 10 for further processing of the data record. Such further processing comprises, in particular, routing of a message with the data record to card provider 4 or to payments settlement system 5.

With this architecture it is advantageous that the PANs for the individual transactions are present in transaction data store 6 not in plain text but replaced by tokens, that is, randomly generated synonyms. Consequently, an attack on transaction data store 6 never yields the information about the PANs so such an attack remains ineffective. To guarantee the maximum possible security, the actual tokenisation device 8 and the combination of index function and replacement table according to the invention held in the so-called secure token store 11 are implemented separately from one another.

Figure 2:
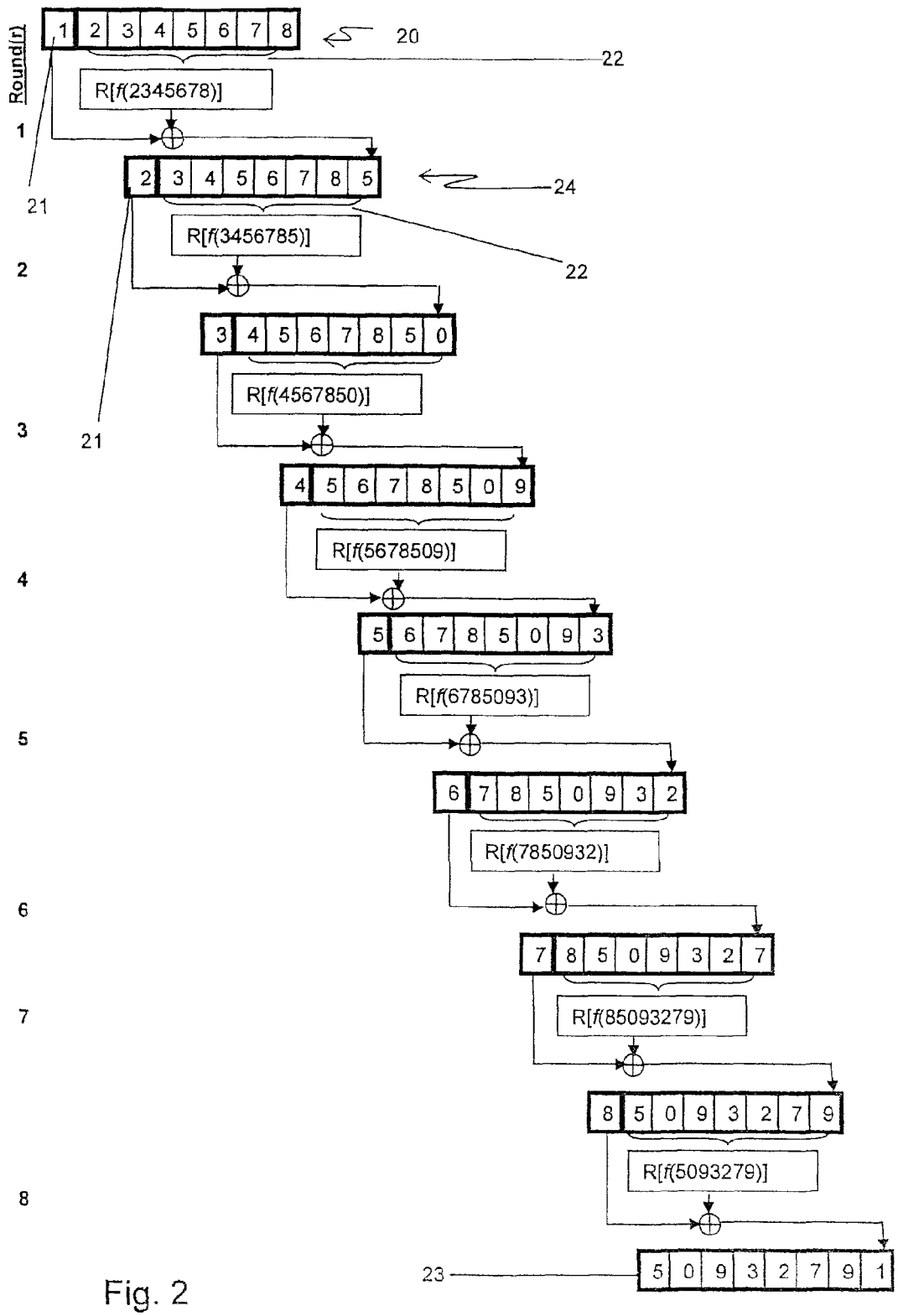
FIG. 2 is a flow chart showing the tokenisation of a data string according to one form of embodiment of the method according to the invention.
Figure 3:
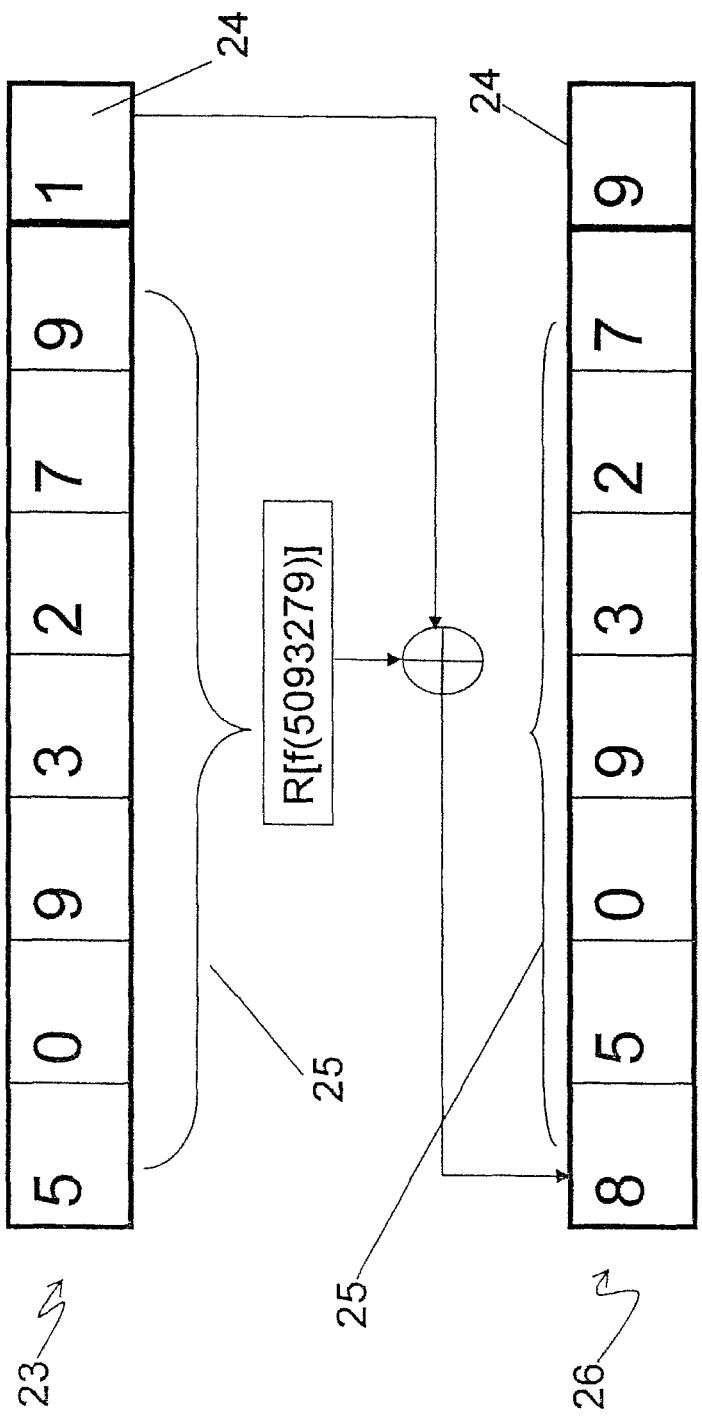
FIG. 3 shows a step of a flow chart for reconstituting the unencrypted data string according to one form of embodiment of the method according to the invention.
Figure 4:
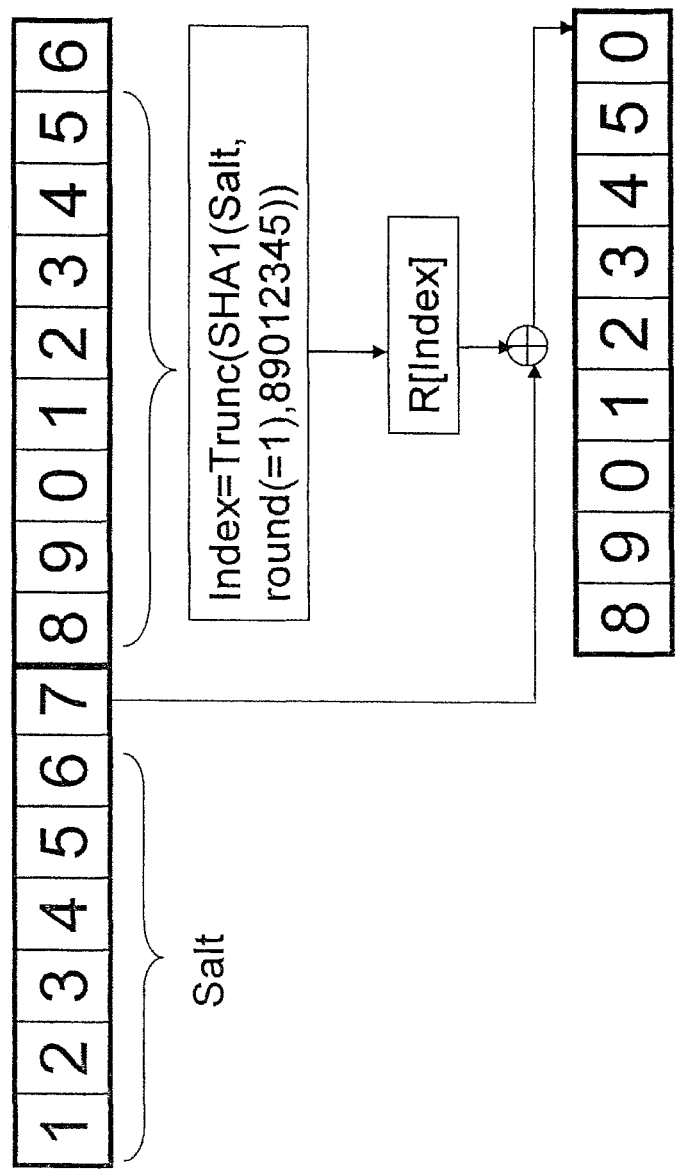
FIG. 4 shows diagrammatically the generation of the index of the replacement table according to one form of embodiment of the method according to the invention.

There follows an explanation with reference to FIGS. 2 to 4 of how the replacement of the PAN as the security-relevant unencrypted data string is carried out by tokenisation engine 8 for a data record describing a transaction. There is also a description of how the token is replaced by the security-relevant unencrypted data string assigned to it when the data record is to be outputted from server 3.

The flow chart in FIG. 2 shows diagrammatically with reference to an example how an unencrypted data string 20, here a credit card number, with the exemplary sequence of characters "12345678" is replaced by a token with the sequence of characters "50932791". This replacement of the PAN by the token is carried out in the tokenisation engine, designated 8 in FIG. 1.

To replace all the characters of the original PAN as a data string to be encrypted, this process must be run through at least eight times, the ordinal number for the corresponding round of the process can be seen on the left next to the flow chart in FIG. 2. However, there is no harm if the process is run through more times in order to increase the security when replacing the data string by the token.

First, the unencrypted data string 20, with the named sequence of characters, is divided into two part strings 21, 22, the first part string containing solely the first character "1" of the data string to be encrypted, while the second part string contains all the remaining characters of the data string to be encrypted, namely "2345678." Now, the single character "1" in the first part string has to be replaced by a randomly selected character from an alphabet with which the tokens are constructed.

Here, in the illustrated form of embodiment, the set of characters, that is, the alphabet from which the PAN is constructed as a unencrypted data string, and the alphabet or the set of characters with which the tokens are constructed, have the same number of characters. Retaining the format, the token also has the same number of characters as the PAN assigned to this token.

In the example in FIG. 2, in the first round the character "1" from the part string must be replaced by only one character.

The character of the token by which the single character of the first part string is replaced is contained in a table which, in the illustrated form of embodiment, contains at least eight randomly selected replacement characters which are stored in eight entries, each provided with an index in the replacement table.

In order to determine which character of the replacement table is to replace the character contained in the first part string, a function is applied to the second part string which serves to determine the index of the entry of the replacement table, the replacement character of which is used to replace the single character of the first part string.

In the flow chart illustrated in FIG. 2 to show the actual formation of the token, R[x] designates the entry of a replacement table R with the index x, the index x being calculated with the aid of a function f, applied to the characters of the second part string, here "2345678." In the selected example, the character "1" of the first part string is replaced in round 1, that is, the first repetition of the replacement process, by the character "5," that is, the entry of the replacement table which has the index x=f (2345678).

The replacement character then forms the last character of the string 24 to be processed in the next round of the process. This string 24 is again divided into two part strings 21, 22 in the second round. Of these part strings again the first part 21 only contains one character, namely the second character "2" of the original unencrypted string 20, and the second part 22 contains the remaining characters "345678" of the original string and, as the last character, the replacement character "5" from the first round.

In the example shown in FIG. 2, this procedure is repeated until all the characters of the original unencrypted data string are replaced by random replacement characters from the replacement table. As the original data string 20 in the illustrated example has a length of eight characters, after eight runs through, all the characters are replaced and the complete token 23 is formed. To increase the security further, the process could be continued for at least one more round. Here, in the illustrated form of embodiment, the number of runs through r is actually double the length n of the original unencrypted data string.

In the complete system, as shown in FIG. 1, token 23 from FIG. 2 would now replace the original data string, that is, PAN 20, and the data record would be passed on by tokenisation engine 8 for processing in data store 6 where it is no longer assignable to the PAN. No direct assignment between token and PAN is stored in any place in engine 8 or in secure token store 11. Instead only the replacement table with its replacement values contained in it and the function f for calculating the index during replacement are stored in secure token store 11.

It is only when a data record is to be passed from server 3 to one of the other components 1, 4, 5 of the system again that the token presenting a pseudonym for the PAN in the data record is replaced again by the PAN in plain text. For this, the steps described for replacement of the PAN by the token are run through in the reverse order.

By way of example FIG. 3 shows the first round for this. The token 23 is first divided into two part strings 25, 24, namely, first part string 25 which contains all except the last character of the token, and second part string 24 which contains as single character the last character of the token, here the character "1." Now the single character of the second part string 24 is replaced by the character of the original data string belonging to the index of the last replacement character.

To generate the corresponding index, index function f is applied to the characters of first part string 25. In the illustrated example this means that the character "1" of the second part string 24 of token 23 is replaced by the character "8" of the original PAN. This original character "8" then forms the first character of the string 26 to be processed in the next, that is, second, round. This string 26 to be processed further is again divided into a first part string 25 and a second part string 24, the latter exhibiting only a single character, namely the last character of the string 26 to be processed further.

FIG. 4 shows by way of example how the index of a replacement character from the replacement table can be determined with the application of a function to the part string of the string to be replaced containing more than one character, irrespective of the question of whether it is the process of tokenisation or of reconstitution of the original data string from the token that is being considered.

In the illustrated form of embodiment, a hash function is applied to a string which is composed of a so-called salt, the round index round, in the present case the round 1, and the characters of the part string containing more than one character. In the selected example, the hash function is the SHA-1 algorithm. The hash value generated in this way is truncated to the x most significant bits, x being the number of bits needed to index all the entries of the replacement table. This avoids the hash function generating indices which do not exist in the replacement table actually stored. When truncated to x bits, the table can have $2^x$ entries which can all be provided with a unique index. Then the index calculated in this way is used to determine the character which replaces the single character of the first part string in the illustrated example.

To guarantee that the process described here can be handled mathematically, in forms of embodiment first the unencrypted data string 20 is converted into an internal representation of the tokenisation engine. If p[0] . . . p[n−1] denotes the individual characters of the unencrypted data string with their position inside the string, the internal representation of this string is $p_{int}[0]$ . . . $p_{int}[n-1]$, in which $p_{int}[0]$ denotes the integral position of the character p[0] within the alphabet A from which the unencrypted data string is constructed, and so on.

In this case, the following steps must be repeated, r times, i denoting the number of the current round (beginning with 1):
1. Calculate the hash value h with the SHA-1 hash algorithm which uses as input a binary string formed by linking the salt, the number of the round i and the string $p_{int}[0]$ . . . $p_{int}[n-1]$.
2. Take k as the most significant 24 bits of h.
3. Define temp as $(p_{int}[0]+R[k])$ mod a, in which R[k] is the entry of the replacement table R with the index k and a is the size of the alphabets of the unencrypted data string and the tokens.
4. Form $p_{int}[j]=p_{int}[j+1]$ for $0 \le j \le n-2$ and $p_{int}[n-1]$=temp.
5. Increase i by 1.

After repeating the steps 1 to 5 r times, the string t[0] . . . t[n−1] is outputted as the external representation of $p_{int}[0]$ . . . $p_{int}[n-1]$, in which $t[0]=A[p_{int}[0]]$, and so on.

The reverse process which generates the original unencrypted data string 20 from the token 23 then works as follows:

Apply the steps shown below r times to the internal representation $t_{int}[0]$ . . . $t_{int}[n-1]$ of the token t[0] . . . t[n−1], in which i denotes the number of the current round (beginning from r):
1. Calculate the hash value h with the SHA-1 hash algorithm which as input uses a binary string which is formed from the salt, the number of the round i and the string $t_{int}[1]$ . . . $t_{int}[n-1]$.
2. Take k as the most significant 24 bits of h.

3. Define temp as $t_{int}[n-1]-R[k]$, in which R[k] is the entry of the replacement table R with the index k.
4. If temp>0, then form temp=temp+a, in which a is the size of the alphabets of the unencrypted data string and the tokens.
5. Form $t_{int}[j]=p_{int}[j-1]$ for $1\leq j\leq n-1$ and $t_{int}[0]$=temp.
6. Increase i by I.

After the steps 1 to 6 are repeated r times, the string p[0] ... p[n−1] is outputted as the external representation of $t_{int}[0]$ ... $t_{int}[n-1]$, in which $p[0]=A[t_{int}[0]]$, and so on.

The operation used in this example for calculating the new character in the steps 3 from the character to be replaced and the replacement characters from the replacement table avoids the need to write the replaced characters into the replacement table when generating the tokens, which again increases security as no assignment between the characters of the original data string and the characters of the token is possible in any place, that is, even in the secure token store.

For the purposes of the original disclosure, it is pointed out that all the features, as revealed from the present description, the drawings, and the claims to a person of ordinary skill in this art, even when they have only been described in concrete terms in connection with certain further features, can be combined both individually and in any combinations, with others of the features or groups of features disclosed here insofar as this has not been expressly excluded or technical circumstances make combinations of this kind impossible or pointless. Exhaustive explicit presentation of all the conceivable combinations of features is waived here solely for the sake of brevity and legibility of the description.

While the invention embodiments have been illustrated and described in detail in the drawings and the preceding description, this illustration and description is provided solely by way of example and is not intended to limit the scope of the invention as defined by the claims. The invention is not limited to the disclosed forms of embodiment.

Modifications to the disclosed forms of embodiment will occur to those knowledgeable in the art from the drawings, the description, and the attached claims. In the claims the word "exhibit" does not exclude other elements or steps, and the indefinite article "a" or "one" does not exclude a plurality. The mere fact that certain features are claimed in different claims does not exclude their combination. References in the claims are not intended to limit the range of coverage.

LIST OF REFERENCES

1 Check-out system
2 Network connection
3 Server
4 Credit card provider
5 Payments settlement systems
6 Transaction data store
7 Input path
8 Tokenisation device
9 Output data path
10 Centra processing unit of server
11 Secure token store
12 Capture device
20 Unencrypted data string
21 First part string
22 Second part string
23 Token
24 Second part string
25 First part string
26 String as intermediate stage

What is claimed is:

1. A computer-implemented method for replacing a security-relevant unencrypted data string from a data record by a token in a tokenisation device, the method comprising:
   receiving the security-relevant unencrypted data string from a processing device;
   generating the token assigned to the unencrypted data string by means of a first sequence of steps:
      providing a replacement table with random entries, each entry being assigned an index of the replacement table;
      dividing the unencrypted data string into two part strings, the first part string of the unencrypted data string consisting solely of the first character of the unencrypted data string and the second part string of the unencrypted data string consisting of the remaining characters of the unencrypted data string;
      calculating an index of the replacement table from the second part string of the unencrypted data string so that an entry of the replacement table is determined;
      generating a first replacement character from the entry determined by the index calculated from the second part string of the unencrypted data string;
      replacing the single character of the first part string of the unencrypted data string by the first replacement character;
      interchanging the first part string of the unencrypted data string and the second part string of the unencrypted data string so that the replaced character of the first part string of the unencrypted data string becomes the last character or the first character of the second part string of the unencrypted data string and the first character or the last character of the second part string of the unencrypted data string becomes the single character of the first part string of the unencrypted data string; and
   repeating the first sequence of steps so that the token assigned to the unencrypted data string is generated;
   transmitting the token to the processing device;
   receiving the token from the processing device;
   reconstituting the unencrypted data string from the token which is assigned to the unencrypted data string by means of a second sequence of steps:
      providing the replacement table;
      dividing the token into two part strings, the first part string of the token consisting of all the characters except the last character of the token and the second part string of the token consisting solely of the last character of the token;
      calculating an index of the replacement table from the first part string of the token so that a particular entry of the replacement table is determined;
      generating a second replacement character from the entry of the replacement table determined by the index calculated from the first part string of the token so that the single character of the second part string of the token is replaced by the second replacement character;
      interchanging the first part string of the token and the second part string of the token so that the single character of the second part string of the token becomes the first character or the last character of the first part string of the token and the last character or the first character of the first part string of the token becomes the single character of the second part string of the token; and repeating the second sequence of steps so that the unencrypted data string assigned to the token is reconstituted; and transmitting the reconstituted unencrypted data string to the processing device.

2. The method according to claim 1, wherein the processing device is a capture device on a data channel which executes the steps of:

capturing the data record transmitted over the data channel in a first direction;

identifying the security-relevant unencrypted data string in the captured data record;

transmitting the security-relevant unencrypted data string to the tokenisation device for generation of the token;

receiving the token from the tokenisation device;

replacing the unencrypted data string in the data record by the token; and onward transmitting the data record with the token over the data channel.

3. The method according to claim 2, wherein the data record is passed on by the capture device to a further device for processing the data record.

4. The method according to claim 3, wherein the further device for processing the data record is a storage device.

5. The method according to claim 2, wherein the capture device executes the steps of:

capturing the data record transmitted over the data channel in a second direction;

identifying the token in the captured data record;

transmitting the token to the tokenisation device for reconstitution of the unencrypted data string;

receiving the unencrypted data string from the tokenisation device;

replacing the token in the data record by the unencrypted data string; and onward transmitting the data record with the unencrypted data string over the data channel.

6. The method according to claim 5, wherein the identification of the unencrypted data string or the token in the data record comprises determining a length and a position of the unencrypted data string or the token.

7. The method according to claim 5, wherein the number of the repetition of the first sequence of steps when generating the token and the second sequence of steps when reconstituting the unencrypted data string is at least n+1, n being a length of a data string to be replaced.

8. The method of according to claim 5, wherein the number of the repetition of the first sequence of steps when generating the token and the second sequence of steps when reconstituting the unencrypted data string is 2n, n being the a length of a data string to be replaced.

9. The method according to claim 5, wherein the calculation of the index of the replacement table during the generation of the token or the reconstitution of the unencrypted data string comprises the following steps:

calculating a hash value (h) by applying a hash function to a binary input which comprises a part string of a data string containing more than one character; and determining x most significant bits of the hash value as an index for the replacement character to be used, x being a number of bits required to provide all the entries of the replacement table with a unique index.

10. The method according to claim 5, wherein when generating the token the first replacement character is calculated from the entry determined by the index calculated from the second part string of the unencrypted data string and a character to be replaced.

11. The method according to claim 5, wherein when reconstituting the unencrypted data string the second replacement character is calculated from the entry determined by the index calculated from the first part string of the token and a character to be replaced.

12. The method according to claim 5, wherein when generating the token the first replacement character is calculated from the entry determined by the index calculated from the second part string of the unencrypted data string and a character to be replaced and when reconstituting the unencrypted data string the second replacement character is calculated from the entry determined by the index calculated from the first part string of the token and a character to be replaced, computing operations for calculating the first replacement character when generating the token and the second replacement character when reconstituting the unencrypted data string are mutually inverse mathematical operations.

13. The method according to claim 2, wherein the identification of the unencrypted data string or an identification of the token in the data record comprises determining a length and a position of the unencrypted data string or the token.

14. The method according to claim 1, wherein the number of the repetition of the first sequence of steps when generating the token and the second sequence of steps when reconstituting the unencrypted data string is at least n+1, n being a length of a data string to be replaced.

15. The method according to claim 1, wherein the number of the repetition of the first sequence of steps when generating the token and the second sequence of steps when reconstituting the unencrypted data string is 2n, n being a length of a data string to be replaced.

16. The method according to claim 1, wherein the calculation of the index of the replacement table during the generation of the token or the reconstitution of the unencrypted data string comprises the following steps:

calculating a hash value (h) by applying a hash function to a binary input which comprises a part string of a data string containing more than one character; and determining x most significant bits of the hash value as an index for the replacement character to be used, x being a number of bits required to provide all the entries of the replacement table with a unique index.

17. The method according to claim 1, wherein when generating the token the first replacement character is calculated from the entry determined by the index calculated from the second part string of the unencrypted data string and a character to be replaced.

18. The method according to claim 1, wherein when reconstituting the unencrypted data string the second replacement character is calculated from the entry determined by the index calculated from the first part string of the token and a character to be replaced.

19. The method according to claim 1, wherein when generating the token the first replacement character is calculated from the entry determined by the index calculated from the second part string of the unencrypted data string and a character to be replaced and when reconstituting the unencrypted data string the second replacement character is calculated from the entry determined by the index calculated from the first part string of the token and a character to be replaced, computing operations for calculating the first replacement character when generating the token and the second replacement character when reconstituting the unencrypted data string are mutually inverse mathematical operations.

20. The method according to claim 1, wherein the unencrypted data string to be encrypted is at least a part of an account number or of a card number.

21. The method according to claim 1, wherein the method is carried out in a server for a cashless payments system.

22. A non-transitory machine-readable data medium with a computer program stored thereon which, when executed by a processor, causes the processor to perform steps of:
receiving a security-relevant unencrypted data string from a processing device;
generating a token assigned to the unencrypted data string by means of a first sequence of steps:
providing a replacement table with random entries, each entry being assigned an index of the replacement table;
dividing the unencrypted data string into two part strings, the first part string of the unencrypted data string consisting solely of the first character of the unencrypted data string and the second part string of the unencrypted data string consisting of the remaining characters of the unencrypted data string;
calculating an index of the replacement table from the second part string of the unencrypted data string so that an entry of the replacement table is determined;
generating a first replacement character from the entry determined by the index calculated from the second part string of the unencrypted data string;
replacing the single character of the first part string of the unencrypted data string by the first replacement character;
interchanging the first part string of the unencrypted data string and the second part string of the unencrypted data string so that the replaced character of the first part string of the unencrypted data string becomes the last character or the first character of the second part string of the unencrypted data string and the first character or the last character of the second part string of the unencrypted data string becomes the single character of the first part string of the unencrypted data string; and
repeating the first sequence of steps so that the token assigned to the unencrypted data string is generated;
transmitting the token to the processing device;
receiving the token from the processing device;
reconstituting the unencrypted data string from the token which is assigned to the unencrypted data string by means of a second sequence of steps:
providing the replacement table;
dividing the token into two part strings, the first part string of the token consisting of all the characters except the last character of the token and the second part string of the token consisting solely of the last character of the token;
calculating an index of the replacement table from the first part string of the token so that a particular entry of the replacement table is determined;
generating a second replacement character from the entry of the replacement table determined by the index calculated from the first part string of the token so that the single character of the second part string of the token is replaced by the second replacement character;
interchanging the first part string of the token and the second part string of the token so that the single character of the second part string of the token becomes the first character or the last character of the first part string of the token and the last character or the first character of the first part string of the token becomes the single character of the second part string of the token; and
repeating the second sequence of steps so that the unencrypted data string assigned to the token is reconstituted; and
transmitting the reconstituted unencrypted data string to the processing device.

23. A data processing device comprising:
a memory; and
a hardware processor configured to perform steps of:
receiving a security-relevant unencrypted data string from a processing device;
generating a token assigned to the unencrypted data string by means of a first sequence of steps:
providing a replacement table with random entries, each entry being assigned an index of the replacement table;
dividing the unencrypted data string into two part strings, the first part string of the unencrypted data string consisting solely of the first character of the unencrypted data string and the second part string of the unencrypted data string consisting of the remaining characters of the unencrypted data string;
calculating an index of the replacement table from the second part string of the unencrypted data string so that an entry of the replacement table is determined;
generating a first replacement character from the entry determined by the index calculated from the second part string of the unencrypted data string;
replacing the single character of the first part string of the unencrypted data string by the first replacement character;
interchanging the first part string of the unencrypted data string and the second part string of the unencrypted data string so that the replaced character of the first part string of the unencrypted data string becomes the last character or the first character of the second part string of the unencrypted data string and the first character or the last character of the second part string of the unencrypted data string becomes the single character of the first part string of the unencrypted data string; and
repeating the first sequence of steps so that the token assigned to the unencrypted data string is generated;
transmitting the token to the processing device;
receiving the token from the processing device;
reconstituting the unencrypted data string from the token which is assigned to the unencrypted data string by means of a second sequence of steps:
providing the replacement table;
dividing the token into two part strings, the first part string of the token consisting of all the characters except the last character of the token and the second part string of the token consisting solely of the last character of the token;
calculating an index of the replacement table from the first part string of the token so that a particular entry of the replacement table is determined;
generating a second replacement character from the entry of the replacement table determined by the index calculated from the first part string of the token so that the single character of the second part string of the token is replaced by the second replacement character;
interchanging the first part string of the token and the second part string of the token so that the single character of the second part string of the token becomes the first character or the last character of the first part string of the token and the last character or the first character of the first part string of the token becomes the single character of the second part string of the token; and repeating the second sequence of steps so that the unencrypted data string assigned to the token is reconstituted; and transmitting the reconstituted unencrypted data string to the processing device.

\* \* \* \* \*